United States Patent [19]

Saito

[11] Patent Number: 4,983,439
[45] Date of Patent: Jan. 8, 1991

[54] METHOD OF MANUFACTURING A RECORDING MEDIUM AND RECORDING MEDIUM

[75] Inventor: Hitoshi Saito, Tokyo, Japan

[73] Assignee: Fuji Photo Film Co., Ltd., Kanagawa, Japan

[21] Appl. No.: 349,550

[22] Filed: May 9, 1989

[30] Foreign Application Priority Data

May 12, 1988 [JP] Japan .............................. 63-62466[U]
May 12, 1988 [JP] Japan .............................. 63-115488

[51] Int. Cl.$^5$ .............................................. B32B 3/00
[52] U.S. Cl. ........................................ 428/64; 428/65;
428/76; 428/913; 369/290; 346/76 L;
346/135.1; 156/60; 264/106
[58] Field of Search ...................... 428/64, 65, 76, 913;
369/290; 346/76 L, 135.1; 430/945; 156/60;
264/106

[56] References Cited

U.S. PATENT DOCUMENTS

| | | | |
|---|---|---|---|
| 2,806,704 | 9/1957 | Burdett, Jr. | 369/290 |
| 2,932,521 | 4/1960 | Flötgen | 369/290 |
| 3,427,033 | 2/1969 | Matsukata | 369/290 |
| 4,630,156 | 12/1986 | Saito | 360/133 |
| 4,877,667 | 10/1989 | Hattori et al. | 369/290 |

FOREIGN PATENT DOCUMENTS 0240237 10/1987 European Pat. Off. .

*Primary Examiner*—Patrick J. Ryan
*Attorney, Agent, or Firm*—Sughrue, Mion, Zinn, Macpeak and Seas

[57] ABSTRACT

A method of manufacturing a disc-like recording medium for use in magnetic, optical, opto-magnetic recording/reproducing devices which are capable of recording still image information and/or reproducing recorded still image information, and a disc-like recording-medium. A center core forming the recording medium is to be carried during the assembling process thereof in such a manner that the other portions of a plate-shaped resilient member than the support point thereof are provisionally secure to a core block by use of an adhesive or that a projection piece section provided in the plate-shaped resilient member is inserted into a recessed portion formed in the peripheral surface of a center hole in the core block so as to be able to secure the projection piece section. Due to this, the plate-shaped resilient member can be prevented from getting out of the core block and also the forces of the plate-shaped resilient member can be maintained at a constant level.

6 Claims, 9 Drawing Sheets

FIG. I(A)
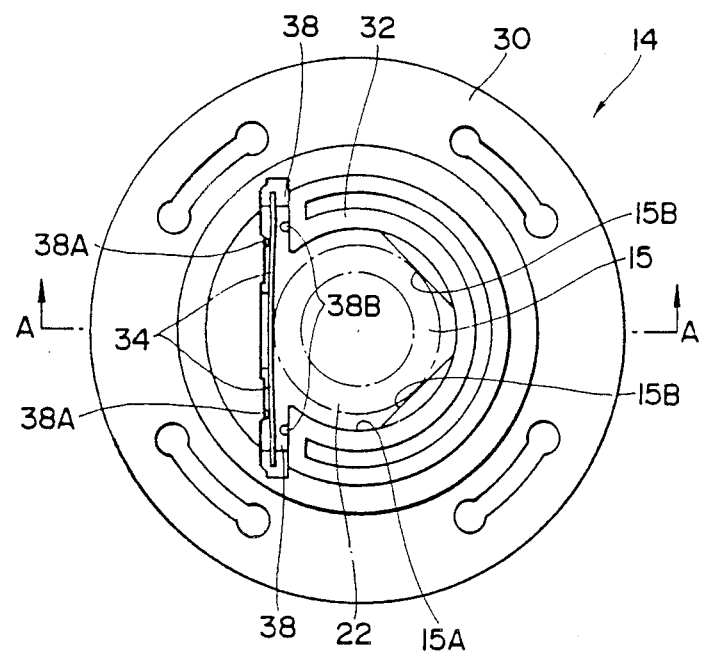
FIG. I(B)
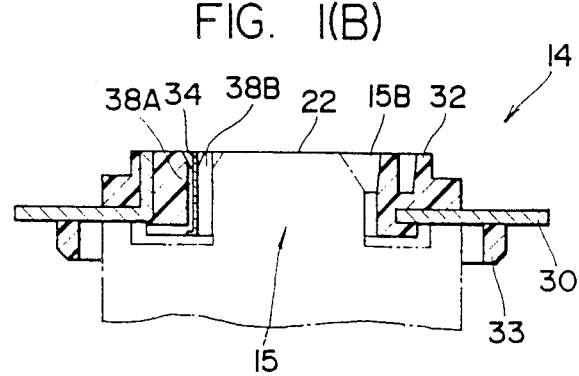

METHOD OF MANUFACTURING A RECORDING MEDIUM AND RECORDING MEDIUM

BACKGROUND OF THE INVENTION

1. Field of the Invention

The present invention relates to a method of manufacturing a recording medium and a recording medium and, in particular, to a method of manufacturing a recording medium into which still image information is recorded by magnetic, optical and optical-magnetic recording/reproducing apparatus or from which recorded image information is reproduced by the same recording/reproducing apparatus, and a recording medium.

2. Description of the Related Art

Recently, there has been developed an attractive electronic still camera system in which an image pickup device such as a solid image pickup element, an image pickup tube or the like is combined with a recording device using an inexpensive magnetic disc having a comparatively large memory capacity to still photograph an object electronically and record the still-photographed image of the object into a rotating magnetic disc, with the recorded still image being reproduced by a separate television system or printer.

In the above-mentioned electronic still camera system, the magnetic disc is generally used in the form of a magnetic recording cartridge. The magnetic disc cartridge contains therein a magnetic disc which is rotatable and is capable of magnetically recording therein still image information and the like. For actual use, the magnetic recording cartridge is mounted to a magnetic recording device which is contained in an electronic camera or to a reproducing device which is arranged integrally with the magnetic recording device or separately therefrom. In mounting the magnetic recording cartridge to the magnetic recording device or reproducing device disposed within the electronic camera, it is troublesome and inconvenient to place a center hole, which is formed in a center core disposed in the central portion of the magnetic disc within the magnetic recording cartridge, directly over a rotary drive shaft provided on the side of the magnetic recording or reproducing device. Thus, there is a possibility that the magnetic recording cartridge cannot be mounted properly to the magnetic recording or reproducing device.

In order to eliminate the above-mentioned trouble, conventionally, there has been proposed a device for loading or unloading the magnetic recording cartridge. The conventional magnetic recording cartridge loading/unloading device comprises an upper cover pivotally supported on a main body of a magnetic recording or reproducing device, and a holder which can be formed integrally with the upper cover or which can be pivotally supported on the device main body or on the upper cover. In the magnetic cartridge loading/unloading device, the magnetic recording cartridge including therein a magnetic disc is inserted into the holder and after then the upper cover is closed to thereby mount the magnetic disc within the magnetic recording cartridge onto a rotary drive shaft of the main body of the magnetic recording/reproducing device. There is disposed a center core in the central portion of the magnetic disc and the rotary drive shaft can be fitted into the center hole formed in the center core to rotate the magnetic disc contained within the magnetic recording cartridge.

Here, it should be noted that the center core of the magnetic disc must be accurately mounted onto the rotary drive shaft. If such mounting is insufficient, then the magnetic disc will be rotated in an offset manner or irregularly, which will incur a possibility that the magnetic head may not be able to record signals into the magnetic disc or reproduce the same from the magnetic disc in an accurate manner as well as a possibility that such offset or irregular rotation of the magnetic disc can have ill effects on the magnetic disc, magnetic head and the like. In view of this, according to the center core of the magnetic disc according to the prior art, in the center hole in the center core into which the drive shaft is fitted, there is provided a resilient piece member formed of resin material. That is, the center core can be pushed against the drive shaft with a given pressure and can be accurately mounted to the drive shaft by means of the energization force of the resilient piece member.

However, the above-mentioned resilient piece member of resin material is low in durability and thermal resistance and thus it may be deformed plastically, so that the magnetic disc may be mis-centered and then it may be rotated eccentrically. In order to solve this problem, in Publication of Laid-open Japanese Utility Model Application (Jikkai) No. 59-138063, there is proposed a center core which uses a metal plate spring in place of the resin resilient piece member. The metal plate spring is adapted such that the two ends thereof are supported in slits formed in the center hole in the center core into which the rotary drive shaft of the magnetic recording/reproducing device is inserted, and that the rotary drive shaft inserted into the center hole can be energized by the plate spring and thus can be pushed against the opposed surface thereof. However, due to the fact that the metal plate spring is simply disposed in the slits formed in the center hole in the center core, when the magnetic disc is fixed to the center core and an upper core for holding the plate spring is not provided, there is a possibility that the metal plate spring can get out of place owing to slight vibrations and the like during its assembling process.

Also, if the metal plate spring is pressed into or bonded to the slits in order to prevent the plate spring from dropping off out of place during the assembling process, then the forces of the metal plate spring may vary in intensity, making it difficult to chuck the recording disc to the rotary drive shaft of the magnetic recording/reproducing device.

SUMMARY OF THE INVENTION

The present invention aims at eliminating the drawbacks found in the prior art methods and recording mediums.

Accordingly, it is an object of the invention to provide a method of manufacturing a recording medium in which a plate spring is prevented from getting out of place in a manufacturing line or the like prior to completion of assembly of a center core and also in which the force of the plate spring does not vary but remains constant, and a recording medium.

In attaining the above object, according to the invention, in order to chuck a recording disc onto a rotary drive shaft of a magnetic recording/reproducing device, there is provided a method of manufacturing a recording medium, comprising the steps of: arranging in the central portion of the recording disc a core block having a central hole engageable over the rotary drive shaft; inserting a plate-shaped resilient member of metal into slits formed in the core block; and, after then, putting an upper core on to cover the two ends of the plate-shaped resilient member, characterized in that the plate-shaped resilient member, except the portion thereof used for a fulcrum, is provisionally fixed to the core block with an adhesive to thereby prevent the plate-shaped resilient member from dropping off from the core block at least during the process of manufacturing the recording medium.

According to the present invention, during the recording medium manufacturing process, the plate-shaped resilient member can be provisionally fixed to the core block with the adhesive and also, after completion of manufacturing of the recording medium the provisional fixing of the plate-shaped resilient member to the slits can be removed. That is, it is possible to prevent the plate-shaped resilient member from dropping off during the recording medium assembling process.

In achieving the above-mentioned object, according to the present invention, in order to hold a recording disc and to center the recording disc, there is provided a recording medium including a recording disc having a center core in the central portion thereof, the center core being formed with a central hole for insertion of a rotary drive shaft of a recording/reproducing device, the center core including on the inner peripheral surface of the center hole a positioning surface for abutment by the peripheral surface of the rotary drive shaft and a plate-shaped resilient member of metal disposed opposed to the positioning surface for pressing the positioning surface against to the rotary drive shaft, characterized in that the plate-shaped resilient metal member has a projection piece member projecting out in the opposite direction of the inner peripheral surface of the center hole and there is formed in the center hole peripheral surface a recessed portion into which the projection piece member can be inserted for fixing.

In other words, according to the invention, the projection piece member for fixing, which is provided in the plate-shaped resilient metal member for holding the rotary drive shaft in the center hole in a chucking manner, can be secured to and fixed by recessed portion formed in the inner peripheral surface of the center hole. Due to this, it is possible to prevent the plate-shaped resilient metal member from dropping off from the center core of the recording disc.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1(A) is a plan view of a center core forming a recording medium according to the invention;

FIG. 1(B) is a section view taken along the line A—A in FIG. 1;

DETAILED DESCRIPTION OF THE INVENTION

Detailed description will hereunder be given of the preferred embodiments of a method of manufacturing recording medium and of a recording medium according to the present invention with reference to the accompanying drawings.

Figure 10:
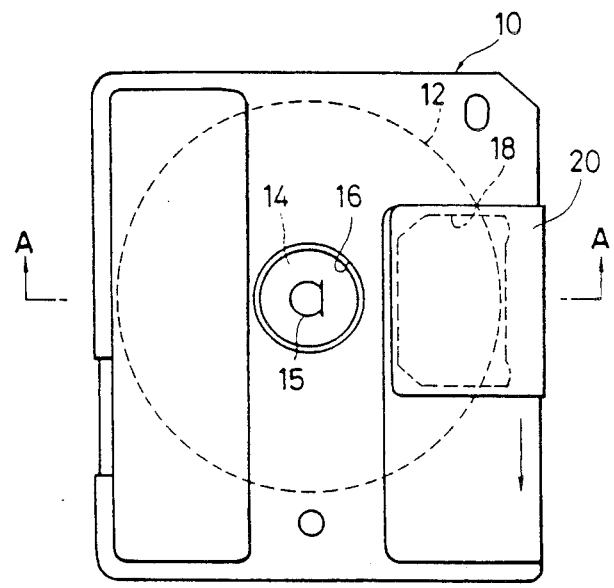
FIG. 10 is a plan view of a magnetic recording cartridge in which a recording medium according to the invention is stored; and, FIG. 11 is a section view taken along the like A - A in FIG. 10.

At first, a method of manufacturing a recording medium in accordance with the present invention will be described in detail. As shown in FIG. 10, a hard case for a recording cartridge 10 is constructed in a substantially quadrilateral shape and, within the recording cartridge, there is stored a recording medium 12 which can be freely rotated and into which still image information and the like can be recorded. In the central portion of the recording medium 12, there is provided a center core 14 which serves as a reinforcing member for the recording medium. The center core 14 is exposed externally through a circular opening 16 formed in the recording cartridge 10. In the recording cartridge 10, there is opened a window portion 18 in which a magnetic head to be discussed later can be positioned, and the window portion 18 for magnetic head can be opened or closed by a slidable shutter 20. In other words, the shutter 20, before the recording cartridge 10 is inserted into a holder to be discussed later, closes the window portion 18 to thereby protect the recording medium 12 against dust and, after the recording cartridge 10 is inserted into the holder, the shutter 20 moves downwardly in FIG. 1 to open the window portion 18 for magnetic head, thereby enabling the still image information or the like to be recorded into or reproduced from the recording medium 12.

Figure 11:
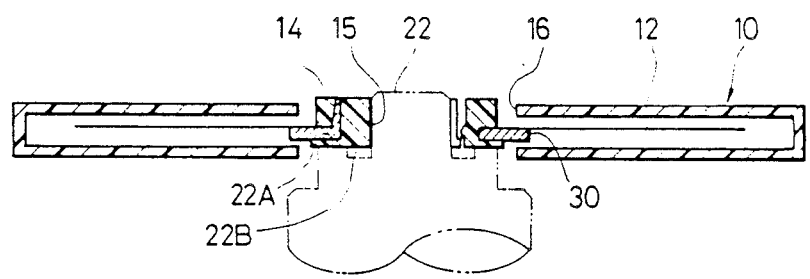

Also, as shown in FIG. 11, a metal core plate 30 is used in a part of the center core 14 and a magnet 22B is disposed on the receiving surface 22A of a rotary drive shaft 22, so that the rotary drive shaft 22 can be inserted into a central hole 15 with accuracy.

The core plate 30, as shown in FIGS. 1(A) and (B), is formed in a disc-like shape and in the central portion of the disc-shaped core plate 30 there is mounted a core block 32 which is formed of resin. The core block 32 has the central hole 15 and, on the inner peripheral surface 15A of the center hole 15 thereof, there are formed a pair of tapered surfaces 15B and 15B. The two tapered surfaces 15B and 15B respectively provide reference surfaces for centering of the center core 14 when the rotary drive shaft 22 is inserted into the center core 14. Also, in the core block 32, there are formed a pair of slits 38 and 38 along the peripheral surface of the center hole 15 in such a manner that they are respectively opposed to the tapered surfaces 15B and 15B. And, in one of the surfaces of the respective slits 38 opposed to the tapered surfaces 15B and 15B, there are provided two projections 38A and 38A which are used to support springs. In addition, in the other surface opposed to the one surface in which the spring supporting projections 38A are provided, there are provided two projections 38B and 38B which are used for bonding. Between the projections 38A and 38B, there are interposed the two ends of a plate spring 34.

Also, a ring-shaped rib 33 formed of resin is fixedly secured to the lower surface of the core plate 30.

Figure 2A:
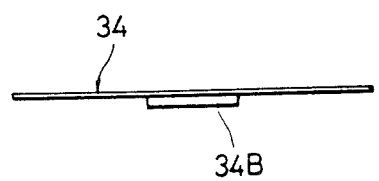
FIGS. 2(A) and (B) are respectively upper and front views of a plate-shaped resilient member of a center core employed in a method of manufacturing a recording medium according to the invention.
Figure 2B:
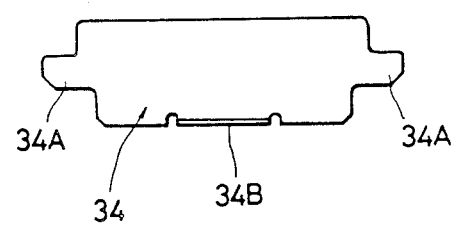

The plate spring 34, as shown in FIGS. 2(A) and (B), includes projection portions 34A and 34A respectively in the two ends thereof and also includes a bent-up portion 34B in the central portion of the lower end thereof.

Next, description will be given below of manufacturing steps included in a method of manufacturing a recording medium constructed in the above-mentioned manner according to the invention.

Figure 3A:
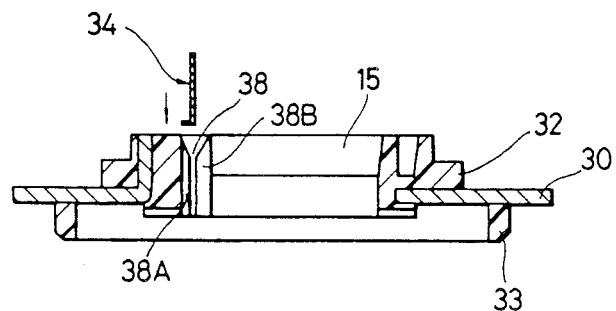
FIGS. 3(A) to (D) and FIG. 4 are respectively section views to illustrate a process for assembling a recording medium employed in a method of manufacturing a recording medium according to the invention.
Figure 3B:
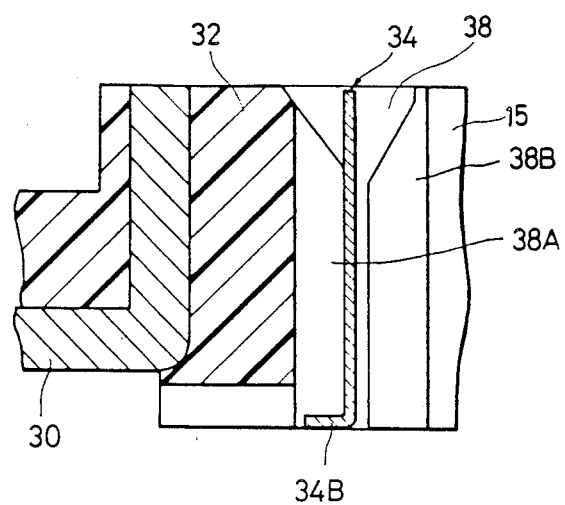
Figure 3C:
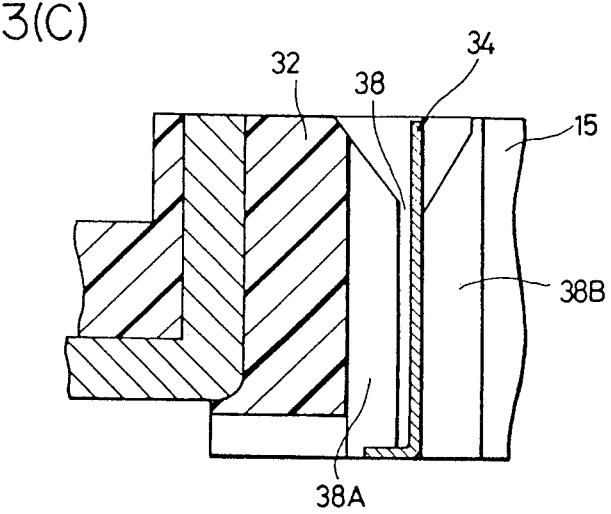
Figure 3D:
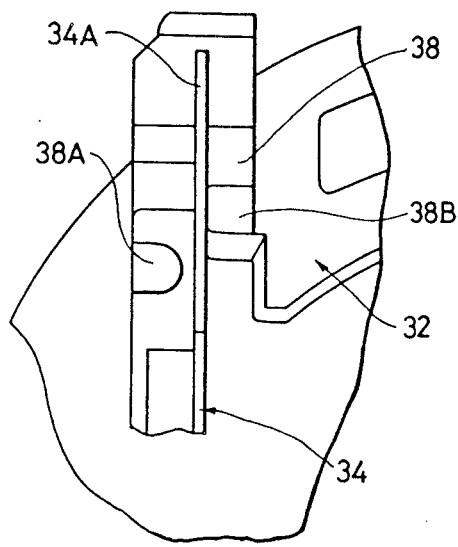
Figure 4:
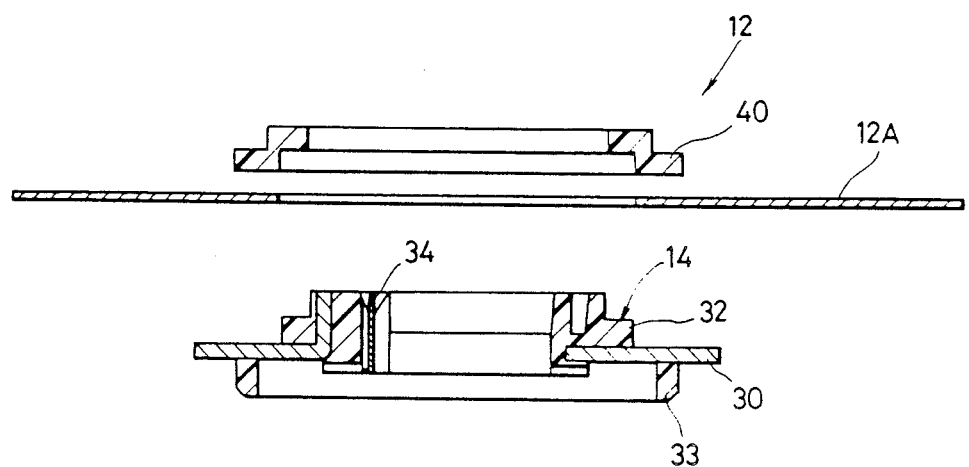

At first, as shown in FIG. 3(A), the two ends of the plate spring 34 are respectively inserted between the projections 38A and 38B in the slit 38 to thereby arrange the plate spring 34 at a position which is shown in FIG. 3(B). Next, as shown in FIGS. 3(C) and (D), the projection 38B and plate spring 34 are bonded to each other by use of an adhesive which can be radiated by ultra-violet rays to turn into a non-sticky state. This ensures that the plate spring 34 cannot be removed from the core block 32 due to slight vibrations or the like occurring in a process for assembling the recording medium. After then, in the final process, as shown in FIG. 4, a recording disc 12A is attached to the center core 14 and then an upper core 40 is mounted to thereby complete the assembly of the recording medium 12. Finally, ultra-violet rays are radiated onto the thus assembled recording medium and the adhesive is treated into a non-sticky state to thereby remove the bonding between the projection 38B and the plate spring 34.

As described above, with use of the plate spring 34 according to the present invention, the recording medium 12 can be assembled while the plate spring 34 is being bonded to the projection 38B provided in the slit 38 and also, after completion of assembly of the recording medium 12, the bonding of the plate spring 34 can be removed to thereby maintain the pressure of the plate spring 34 at a constant level.

In the above-mentioned embodiment, the ultra-violet ray, non-sticky adhesive is used as an adhesive, which can be made non-sticky when it is radiated by the ultra-violet rays. However, the invention is not always limited to this, but the same effects can also be obtained by use of other adhesives which can be made non-sticky through a change with temperatures, a change with humidity, a change with the passage of time, or by means of radiation of light rays. Alternatively, an adhesive, which is comparatively weak in exfoliation strength, may be used so that, after completion of assembly of the recording medium, the adhesive surface of the plate spring can be peeled off by the first insertion of the rotary drive shaft 22.

As has been described above, in the method of manufacturing a recording medium according to the present invention, due to the fact that the plate spring can be provisionally securing to the core block, it is possible to prevent the plate spring from coming off from the core block and, after completion of manufacture of the recording medium, the provisional securing of the plate spring can be removed. Also, due to the fact that the pressure of the plate spring can be maintained at a constant level by using as the support point the portion thereof to which the adhesive is not bonded, it is possible to prevent the deterioration of the chucking condition thereof.

Now, referring to FIGS. 5 to 9, there is shown a recording medium which is another embodiment according to the present invention. A recording medium 112 shown in FIG. 9(E) can be constructed by mounting a core block 52 of resin to a recording disc 12A through an upper core 40.

Figure 5:
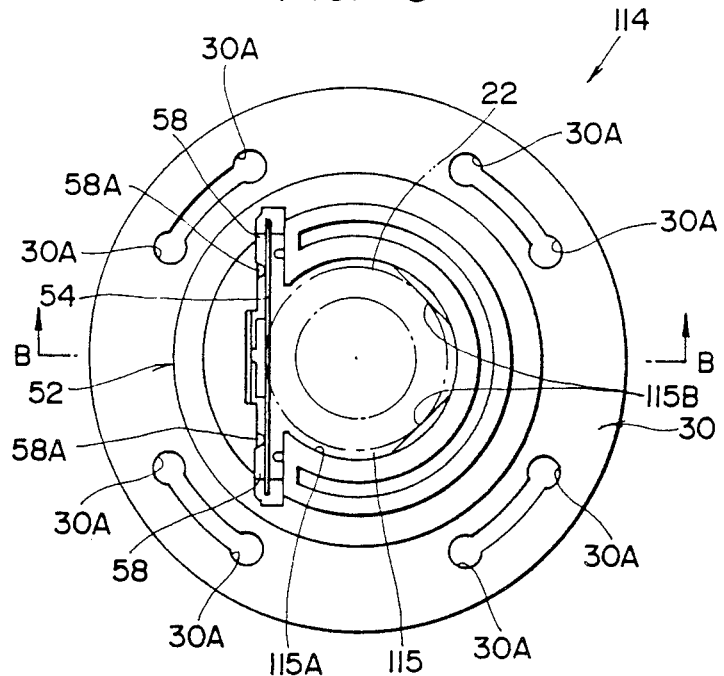
FIG. 5 in a plan view of a center core of a recording medium according to the invention.
Figure 6:
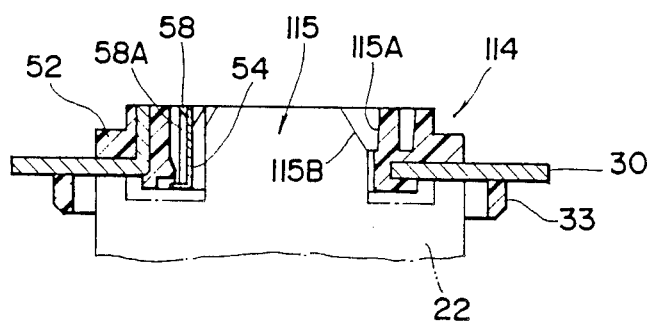
FIG. 6 is a section view taken along the line B—B in FIG. 5.
Figure 7:
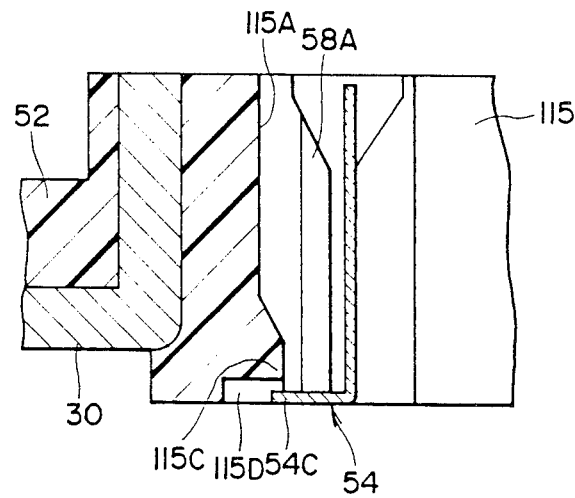
FIG. 7 is a section view of main portions of the center core shown in FIG. 6.

As shown in FIGS. 5 and 6, the core block 52 has a center hole 115 and the center hole 115 in turn has an inner peripheral surface 115A on which a pair of tapered surfaces 115B, 115B are formed. The two tapered surfaces 115B, 115B provide reference surfaces for centering a center core 114 when the center core 114 is fitted over the rotary drive shaft 22. Also, in the core block 52, there are formed a pair of slits 58, 58 along the peripheral surface of the center hole 115 in such a manner that they opposed to the tapered surfaces 115B, 115B, respectively. And, in the respective slits 58, there are provided projections 58A, 58A such that they extend toward the tapered surfaces 115B, 115B, respectively. In addition, as shown in FIG. 7, in the inner peripheral surface 115A of the core block 52, there is provided another projection 115C and, downwardly of the projection 115C, there is formed a recessed portion 115D. Moreover, when the core block 52 is outsert molded, a ring-shaped rib 33 shown in FIG. 6 is mounted to the lower surface of the core plate 30. This mounting can be achieved by pouring the resin forming the rib 33 into holes 30A, 30A formed in the same circumference of the core plate 30 and then by hardening the poured resin together with the rib 33, when the core block 52 is outsert molded.

Figure 8A:
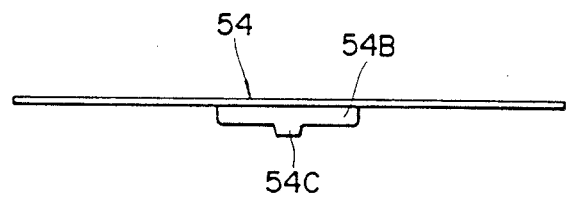
FIGS. 8(A), (B) and (C) are respectively upper, front and side views of a plate-shaped resilient member provided in a center core of a recording medium according to the invention.
Figure 8B:
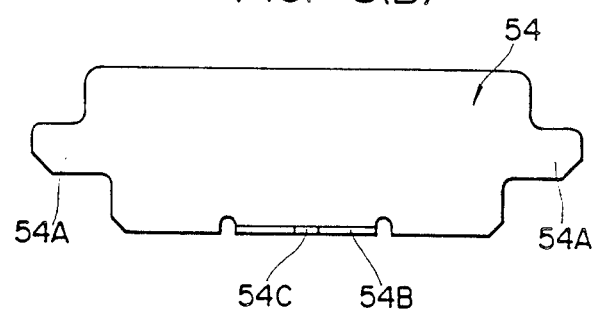
Figure 8C:
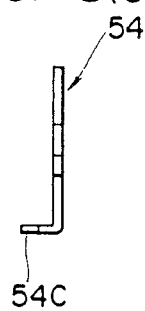

In the plate spring 54, as shown in FIGS. 8(A) to (C), there are provided projected portions 54A, 54A which are disposed on the two ends of the plate spring 54, respectively. In the central portion of the lower end of the plate spring 54, there is formed a bent-up portion 54B and there is further provided a projection piece member 54 in the bent-up portion 54B. When the plate spring 54 is inserted into the slits 58, 58, as will be discussed later, the projection piece member 54C of the plate spring 54 gets over the projection 115C of the core block 52 and is then secured by the recessed portion 115D. In this condition, due to the fact that there is formed a clearance between the end of the projection piece member 54C and the recessed portion 115D, when the rotary drive shaft 22 is inserted into the center hole 115, the plate spring 54 can be flexed about the projections 58A, 58A in the slits 58, 58 which are in contact with the projected portions 54A, 54A, respectively. It should be noted here that, on the two sides of the recessed portion 115d, there are formed recessed portions (which are not shown) for receiving the bent-up portion 54B.

Now, description will be given below of a process for manufacturing the recording medium constructed in the abovementioned manner according to the present invention.

Figure 9A:
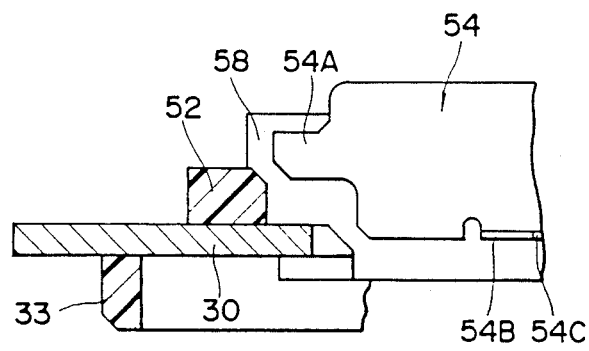
FIGS. 9(A) to (E) are respectively section views to illustrate a process for manufacturing a recording medium according to the invention.
Figure 9B:
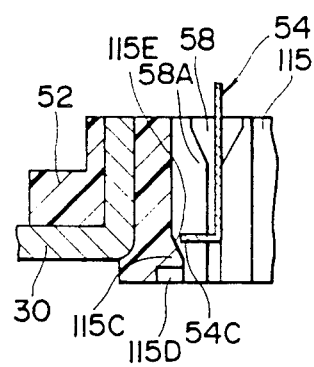

At first, as shown in FIG. 9(A), the plate spring 54 is inserted into the slits 58, 58. At that time, as shown in FIG. 9(B), due to the elastic deformation of the plate spring 54, the projection piece member 54C of the plate spring 54 runs through an inclined surface 115E of the projection 115A in the center hole 115 on to the projection 115C.

Figure 9C:
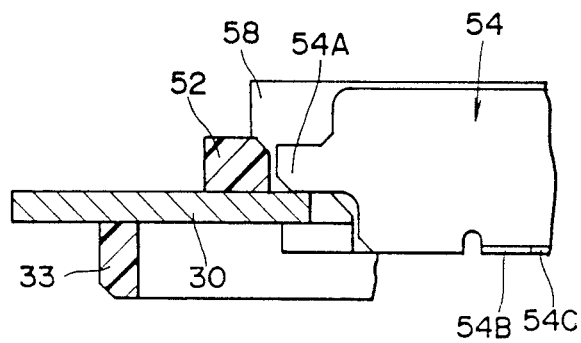
Figure 9D:
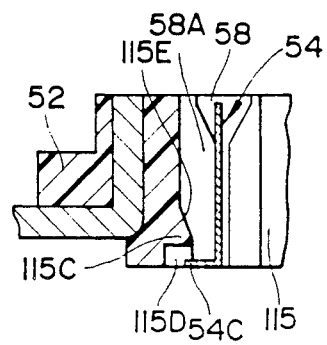

In this state, if the plate spring 54 is depressed further downward, then, as shown in FIG. 9(D), the projection piece member 54C of the plate spring 54 climbs over the projection 115C and moves into the recessed portion 115D. In other words, since the upward movement of the projection piece member 54C is obstructed by the projection 115C, the plate spring 54 is not able to move upwardly. In this case, as shown in FIG. 9(C), since the lower surfaces of the projected portions 54A, 54A of the plate spring 54 are respectively in contact with the upper surface of the core plate 30, the plate spring 54 is prevented against the downward movement thereof.

As a result of this, in the manufacturing line of the recording medium, it is possible to prevent the plate spring 54 from getting out of place due to slight vibrations or the like.

Figure 9E:
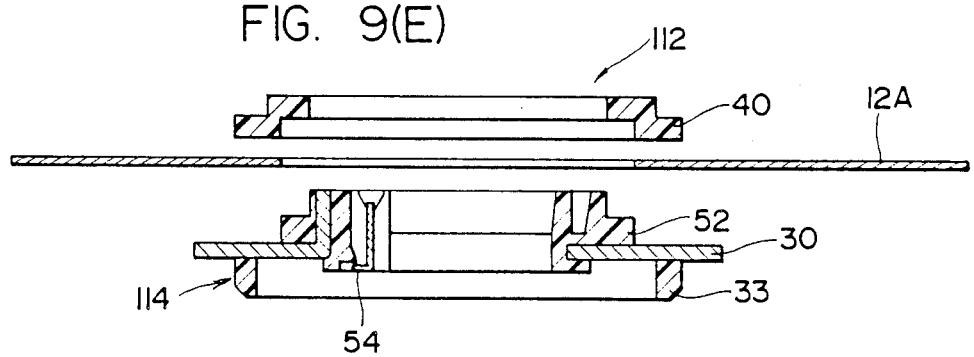

Also, in the final assembling process, as shown in FIG. 9(E), the recording disc 12A is fixedly secured to the center core 114 and then the upper core 40 is mounted to thereby complete the assembly of the recording medium 112.

As mentioned above, according to the present invention, simply by inserting the plate spring 54 into the slits 58, 58, the plate spring 54 can be secured to the core block 52, so that the plate spring 54 can be prevented from dropping off out of place in the manufacturing line of the recording medium. Also, since there is no need to mount the plate spring 54 by use of an adhesive or pressure, the support point or fulcrum of the plate spring 54 remains unchanged even when it is deformed elastically, so that it is possible to prevent the force of the plate spring 54 from varying.

Further, according to the invention, if the plate spring has been previously inserted into and mounted to the center core 114 outside the manufacturing line, then the recording medium can be manufactured in a similar production process to a center core using a resilient piece member of resin according to the prior art, so that it is possible to manufacture two kinds of recording medium simultaneously, one recording medium having a center core using a metal plate spring and the other having a center core using a resin resilient piece member, without re-organizing the manufacturing line.

As has been described hereinbefore, according to the recording medium of the invention, since the projection piece member of the plate spring is secured to the recessed portion in the center hole in the core block forming part of the center core, the plate spring is prevented from getting out of place even when vibrations occur in the manufacturing line or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A recording medium including a center core formed with a center hole for a rotary drive shaft in the central portion of a recording disc, characterized in that in the inner peripheral surface of said central hole in said center core there is provided a positioning surface for alignment with which the peripheral surface of said rotary drive shaft can be brought into contact, that there are formed a pair of slits facing said center hole in said center core and disposed on the opposite side to said positioning surface and into said pair of slits there are inserted the two ends of a plate-shaped resilient member for pushing said rotary drive shaft against said positioning surface, and that in said plate-shaped resilient member there is provided a projected portion for securement and in said center core there is provided a securing means for securing said projected portion.

2. A recording medium as set form in claim 1, wherein in said center core there are provided a projection for securement and a recessed portion downwardly of said projection and substantially in the central portion of said plate-shaped resilient member there is provided a projection piece section, whereby, when said plate-shaped resilient member is deformed elastically, said projection piece section of said resilient member runs over said projection for securement in said center core and then gets into said recessed portion in said center core to thereby guide the movement of said plate-shaped resilient member in one direction.

3. A recording medium as set forth in claim 2, wherein on the two ends of said plate-shaped resilient member there are provided projection piece sections and said projection piece sections can be brought into contact with the receiving surface of said center core to thereby prevent the movement of said plate-shaped resilient member in a direction other than said one direction.

4. A method of manufacturing a recording medium, comprising the steps of:
inserting the two ends of a plate-shaped resilient member of metal into a pair of slits respectively facing a central hole in a core block and opposed to reach other;
securing provisionally and removably the other portions of said plate-shaped resilient member than the two side support points thereof to said core block by use of an adhesive to thereby form a center core;
inserting said center core into a central opening of a recording disc from one side thereof to thereby mount said center core to said recording disc; and,
placing an upper core over said center core from other side of said recording disc to thereby cover the two ends of said plate-shaped resilient member and also to allow said center core and upper core to hold said recording disc therebetween.

5. A method of manufacturing a recording medium as set form in claim 4, wherein in each of said pair of slits there is provided a projection for bonding which is used to provisionally secure said plate-shaped resilient member by use of an adhesive and wherein said projection for bonding is disposed in the surface of said slit opposed to the surface thereof in which a support projection serving as a support point for said plate-shaped resilient member is disposed.

6. A method of manufacturing a recording medium as set forth in claim 4, wherein said adhesive is an ultraviolet, non-sticking adhesive and wherein said ultra-violet, non-sticking adhesive can be made non-sticky when the same is radiated by ultra-violet rays after completion of assembly of said recording medium.

* * * * *